March 7, 1967 A. LICHOWSKY 3,307,810

IRROTATIONAL LOAD MOUNT

Filed June 29, 1965 3 Sheets-Sheet 1

INVENTOR.
ABRAHAM LICHOWSKY
BY
Samuel Cole
Attorney

March 7, 1967 A. LICHOWSKY 3,307,810

IRROTATIONAL LOAD MOUNT

Filed June 29, 1965 3 Sheets-Sheet 2

INVENTOR.
ABRAHAM LICHOWSKY
BY
Attorney

INVENTOR.
ABRAHAM LICHOWSKY
BY Samuel Cohen
Attorney

3,307,810
IRROTATIONAL LOAD MOUNT

Abraham Lichowsky, Los Angeles, Calif., assignor to Radio Corporation of America, a corporation of Delaware Filed June 29, 1965, Ser. No. 468,077
10 Claims. (Cl. 248—27)

This invention relates to a new and improved bearing for supporting a load which must be moved relatively short distances along a linear path.

In a particular mass memory system employing magnetic storage cards which are driven at high speed past a group of recording heads, means are provided for linearly moving the heads to different discrete positions for reading from and writing on different groups of tracks on the cards. An ideal bearing for the heads to permit such linear movement should have the following characteristics: lower; extended fatigue life; low mass; substantially no friction; the ability to permit precise and repeatable amounts of linear movement; the ability to accurately reset to a predetermined home position; substantially zero backlash; and relatively low deflection constant (displacement per unit of force) in all directions perpendicular to the desired direction of motion. Coulomb friction in the bearing is undesirable and viscous damping is the preferred form of damping to insure system stability.

An object of the present invention is to provide a bearing system for supporting a load such as a group of magnetic heads which has the features discussed above.

Another object of the invention is to provide a bearing of the general type discussed above which requires no lubrication.

The bearing of the invention comprises a block of resilient material formed with four symmetrically arranged, elongated openings therethrough. Each opening lies end-to-end with one other opening. There is also a fifth opening in the block and it lies side-by-side with the other four openings. The first and second openings are located on one side of the fifth opening and the third and fourth openings lie on the other side of the fifth opening. A region of the bearing between the first and second openings is adapted to secure the bearing to a support and a region of the bearing between the third and fourth apertures therein is adapted to secure the bearing to a movable load.

In a preferred form of the invention in which the load is elongated, both ends of the load are supported by bearings of the type described above, hereafter termed "flexure" bearings or elements. The long dimension of the apertures in the flexure bearings extend at right angles to the linear path along which the load is to be moved. Movement of the load from its home position in a direction toward one flexure bearing places that bearing under compression and the other bearing under tension and movement of the load toward the other flexure element causes the reverse to occur.

The invention is discussed in greater detail below and is shown in the following drawings of which:

Figure 6:
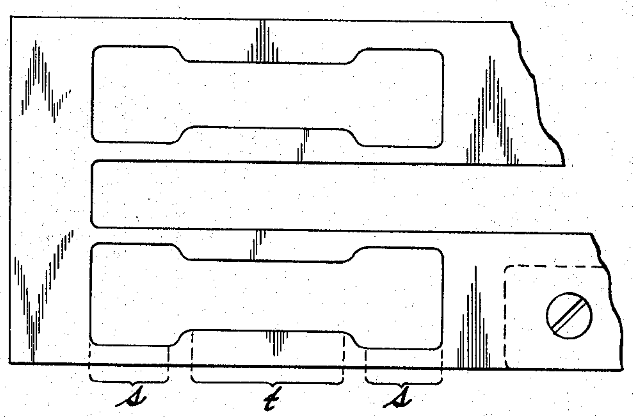

FIGURES *5a* and *5b* are broken-away simplified plan views of a portion of a bearing; and FIGURE 6 is a broken-away view of another form of flexure bearing according to the invention.

Figures 1, 2:
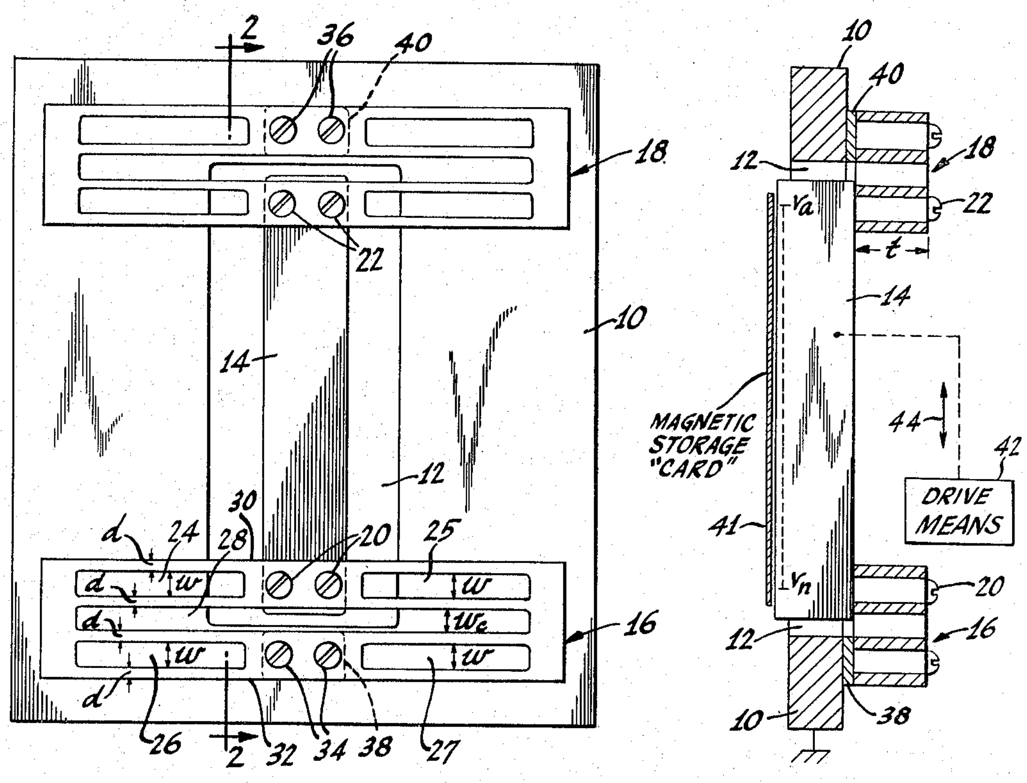
FIGURE 1 is a plan view of the mount showing the load supported by two flexure bearings in accordance with the invention.
FIGURE 2 is a cross-section taken along line 2—2 of FIGURE 1.

FIGURES 1 and 2 show a rigid frame 10 formed with a central opening 12 therein. The load, shown as a group of magnetic heads 14, is secured at its opposite ends to flexure bearings 16 and 18, respectively, by means of screws or bolts 20 and 22.

Each flexure bearing comprises a block formed with a plurality of elongated openings which are parallel to one another and which open on opposite surfaces of the block. The bearings shown have four shorter elongated openings 24, 25, 26 and 27 of the same length and one central opening 28 which extends over the major portion of the length of the bearing. The four shorter openings are all of the same width $w$. The width $w_c$ of the central opening 28 may be, but is not necessarily, the same as the width $w$ of the smaller openings. The regions of restricted cross-section between the central opening 28 and openings 24, 25, 26 and 27 and between the latter openings and the outer edges 30 and 32 of each flexure bearing are of the same thickness $d$.

The flexure bearings 16 and 18 may be made of a resilient metal such as beryllium copper, beryllium nickel, stainless steel or certain aluminum alloys. Or modern non-metallic materials such as resilient glass compounds, fiberglass, reinforced plastics, or other high-strength plastic compounds may be used instead. The openings may be machined into a rectangular block of the material. Alternatively, the bearings may be precision cast or molded.

The bearings 16 and 18 are secured to the metal frame 10 by screws 34 and 36. Spacers 38 and 40 (FIGURE 2) are employed to maintain the flexure bearings 16 and 18 spaced from the frame 10 over the major portion of the extent of the flexure bearings. These spacers are also shown in phantom view in FIGURE 1.

In the operation of the arrangement of FIGURES 1 and 2, magnetic storage cards such as shown at 41 in FIGURE 2 are driven at a high rate of speed past the group of recording heads 14. The direction of movement is along a path which extends into and out of the paper in FIGURE 2. In one practical system there are 16 recording heads in the group 14, the first such head being located at $r_a$ and the last such head at $r_n$. These heads read information from and write information onto 16 parallel tracks on the card. The drive means 42 is capable of positioning the magnetic heads 14 to 16 different discrete positions in the direction of arrows 44. Each discrete step is a relatively small distance as, for example, a very small fraction such as $\frac{1}{40}$ of an inch. When the heads 14 are moved to a new position they can write on or read from a group of 16 tracks interlaced between other groups of tracks.

Figure 3:
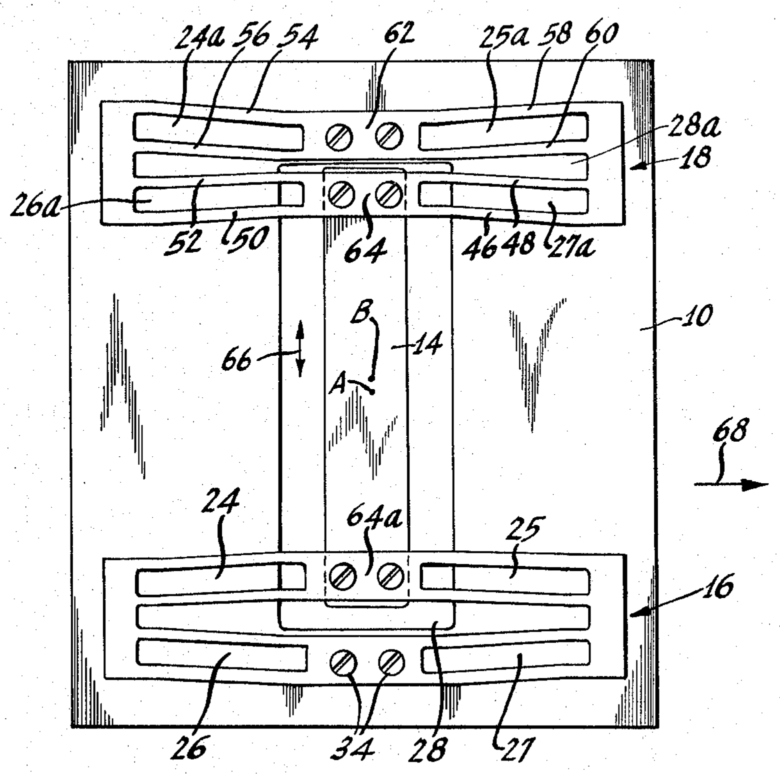
FIGURE 3 shows the bearings of FIGURE 1 when the load has been moved to one extreme position.

FIGURE 3 shows the magnetic heads 14 moved to one extreme position in the direction toward flexure bearing 18. This causes flexure bearing 18 to be placed under compression. Its resilient portions of restricted cross section, hereafter termed "arms" 46, 48, 50 and 52 bend in one direction and its arms 54, 56, 58 and 60 bend in the opposite direction. The portion 62 of the flexure bearing which is secured to the frame 10, of course, remains in relatively fixed position and the portion 64 of the flexure bearing which is secured to the heads 14 moves toward portion 62. The result of this movement is the flexing of the various arms, as just discussed, and the distortion of the central aperture **28*a* in the manner shown. As is clear from the figure, the width of the aperture at the central region thereof reduces substantially. There is also some reduction, although considerably smaller, in the width of the apertures 24*a*–27*a***.

The movement of the group of heads 14 has the opposite effect on flexure bearing 16 than it does on flexure bearing 18. It places flexure bearing 18 under tension causing the bending of the various arms shown in FIG- URE 3 and the substantial increase in width of the opening 28. There is also a slight decrease in width of the openings 24–27 as will become clear from the discussion below of FIGURES 5*a* and 5*b*.

In the home position of the load 14 shown in FIGURE 1, the bearings 16 and 18 are neither under compression nor tension. When the load is moved away from its home position, one of the bearings is placed under compression and the other under tension, as shown in FIGURE 3. This, of course, results in the tendency of the head always to return to its home position, a desirable feature in a number of applications.

Figures 5A, 5B:
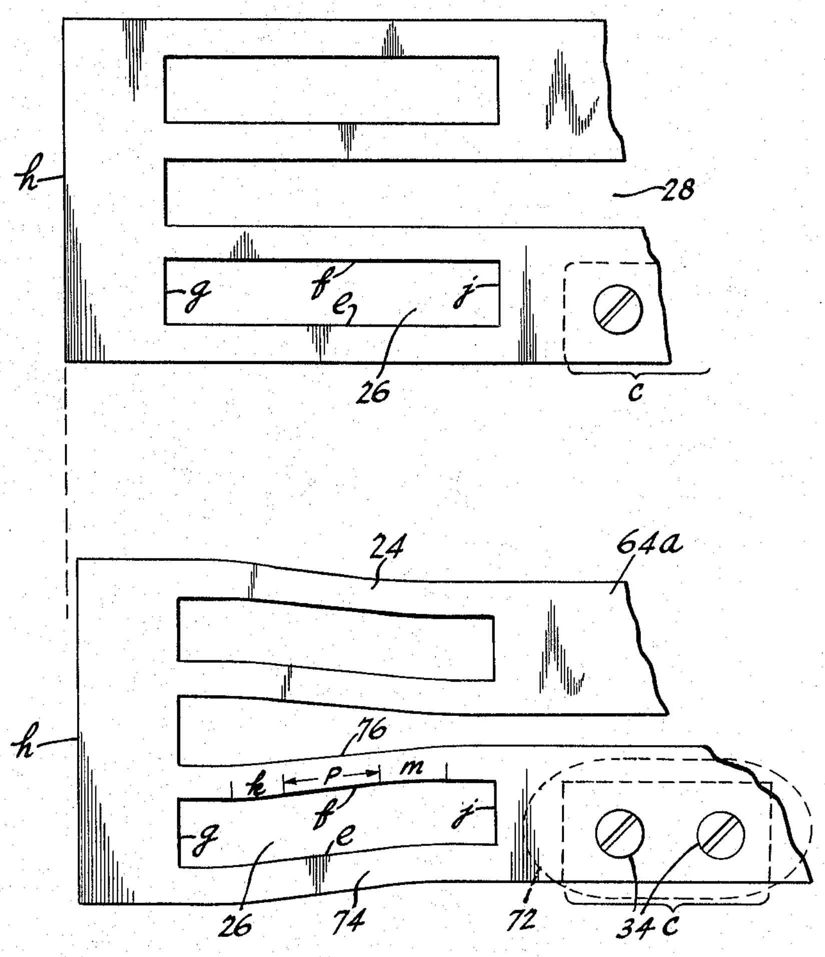

As should be clear from the figures, the bearings of the present invention are substantially friction free. They also have the important advantage that they constrain the movement of the load 14 very precisely to a linear path parallel to the long dimension of the load 14, that is, in the direction of arrows 66 (FIGURE 3.) FIGURES 5*a* and 5*b*, which are somewhat simplified showings of a portion of one bearing, show why this is so.

FIGURE 5*a* shows a bearing in its home (undeflected) position. In a practical bearing, the longer surfaces *e* and *f* which define an opening such as 26 may be flat and parallel or may be shaped for uniform stress distribution and the shorter surfaces *j* and *g* may be shaped or rounded for minimal stress concentration. For purposes of the present discussion, surfaces *j* and *g* may be considered to be flat and at right angles to surfaces *e* and *f* so that the opening 26 is of rectangular cross-section. The shorter wall *j* of opening 26 is at right angles to the edge portion *c* which is firmly fixed to the frame 10 (the frame is not shown in FIGURE 5*a*). the walls *e* and *f* of the opening are of the same length and are parallel so that the shorter wall *g* of the opening is parallel to the wall *j*. The edge *h* of the bearing is parallel to the wall *g* of the opening and therefore initially is at right angles to the edge portion *c* of the bearing.

FIGURE 5*b* shows the bearing deflected in one direction. The edge portion *c* remains in the same position since it is securely fixed to the frame. In view of the fact that the portion 72 of the bearing is a solid block of material, the inner wall portion *j* is essentially fixed with respect to edge *c*. Therefore, *j* remains at right angles to *c*. The inner walls *e* and *f* do bend (in the region *k* and *m* they are somewhat S shaped and in the region *p* they are relatively flat) but must remain of equal length. Accordingly, the short edge *g* remains parallel to the short edge *j*. Edge *h* of the bearing remains parallel to the wall *g* of the opening 26 and therefore must remain at right angles to edge portion *c*. In view of this there is essentially no twisting of the surface *h* about bearing portion *c* and screws 34.

When the bearing is stressed, either in its compressed or tension state, the opposite surfaces *g* and *j* (FIGURE 5*b*) of each smaller opening move slightly closer together. Further, due to the bending of the arms such as 74 and 76 (FIGURE 5*b*) there is a slight decrease in the width *w* of each smaller opening. There are four symmetrically arranged smaller openings, however, and any deflection of the walls of one opening corresponds to substantially identical, mirror image deflections of the walls of other openings. For example, in bearing 18 of FIGURE 3, when the bearing deflects about opening 26*a*, a mirror image deflection of the bearing, with respect to a first plane, occurs about opening 24*a* and a mirror image deflection of the bearing, with respect to a second plane orthogonal to the first plane, occurs about opening 27*a*. The bearing overall, in view of its symmetry and the other factors discussed above, acts like a balanced mechanical bridge and the load, which is attached to one apex of the bridge, is constrained to move along a linear path, as indicated by arrow 66 of FIGURE 3.

Put in a somewhat different way, each bearing, such as 18 and 20, presents a stiff box structure to forces in any direction except in the one corresponding to the desired direction of movement. Each box structure includes four identical parallelograms (the openings such as 24, 25, 26 and 27) and they are so arranged that there is essentially no binding or twisting at the center portion of the region *h* (FIGURE 5*b*), representing the connection between two adjacent parallelograms, in response to twisting and sidewise loading.

Of course, with the arrangement shown in FIGURES 1–3, where there are bearings supporting opposite ends of an elongated load, there is even less tendency for the load to deviate from movement along a linear path. Each bearing tends to prevent and twisting or sidewise motion of the load. The second bearing, that is, the one under tension which is supporting the load, may be analyzed in a manner quite analogous to that employed in the analysis of the bearing under compression. In both cases, there is essentially no tendency for the bearing to twist when the load is moved. Further, two bearings, one at each end of a long load, help to stabilize the load itself. Without such support, even if one end of the load were moved in absolutely linear fashion, the other end could have the tendency to flex or vibrate under certain conditions.

While it has been assumed, for purposes of this explanation, that the elongated openings such as 26 are of rectangular cross-section, the analysis is equally valid for the openings shown in the practical bearing in which the corners are slightly rounded. In either case, the relationship between the shorter walls and the edge *c* is maintained the same regardless of whether the bearing is under stress or not. Similarly, the initial right angle relationship between the surfaces *h* and the edge portion *c* of the bearing is maintained the same during the operation of the bearing.

Improvement of the relative deflection constants of the bearing shown in the various figures discussed so far can be realized by judicious shaping of the various openings to minimize the distortion of the deflected bearing under side loads. In the bearing shown in FIGURE 6, for example, the four shorter openings (only two of which are shown) are enlarged at opposite ends thereof, thereby reducing the thickness of the wall regions *s* with respect to the wall regions *t*. In this bearing, the major portion of the bending occurs in the regions *s* and the region *t* remains quite stiff. In other bearings, complex uniform stress shapes (parabolic and hyperbolic) may be used to obtain high performance in applications in which the bearings must be of small size.

The thickness dimension *d* (FIGURE 1) of the bearing is made sufficiently small to permit the load readily to be deflected to its limit position and the maximum stress (in certain areas of stress concentration at maximum deflection) to be well below the value which would significantly shorten the fatigue life of the bearing. But *d* is not made so small that the bearing becomes too "soft" in undesired deflection directions or has the tendency to resonate at low frequency. The precise value of *d*, in a particular case, is determined by the material employed, the maximum amount of deflection desired, the bearing length, the characteristics of the load and so on. In the example under discussion, the various parameters are chosen to maintain the magnetic heads in uniform and highly repeatable operative relationship with the magnetic storage card as the card is driven past the heads. (In practice, the heads may actually be in contact with the cards. However, for the sake of drawing clarity, a slight amount of spacing is shown in FIGURE 2.)

Figure 4:
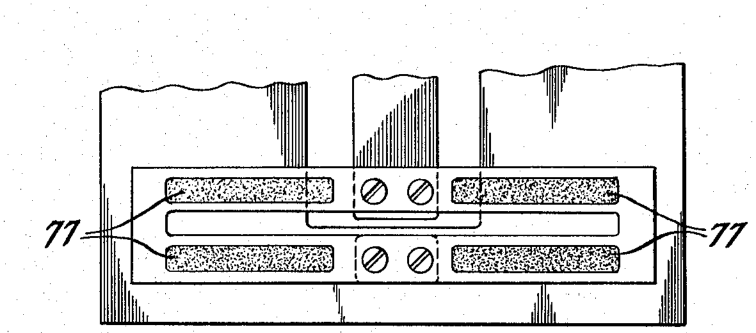
FIGURE 4 shows a modified form of flexure bearing according to the invention.

A modified and improved form of flexure bearing is shown in FIGURE 4. It includes damping material 70 such as silicone rubber, cork compounds or other damping compounds, located in the smaller elongated openings in the bearing. The function of this material is to dissipate both primary and secondary oscillatory energy which may be imparted to the bearings when the load is abruptly moved from one discrete position to another.

In the discussion above, the invention has been illustrated in terms of the linear movement of a group of magnetic heads. It is to be appreciated that many other uses are possible for the invention. Some examples include the fine focusing of optical instruments, limited linear adjustment of high precision measuring instruments, and so on.

In the claims which follow, the term "elongated aperture" is intended to be generic to the straight sided apertures such as those of the embodiment of FIGURES 1–5 and shaped apertures as, for example, are shown in FIGURE 6.

What is claimed is:

1. In combination: a load; supporting means; and an elongated parallelogram flexure bearing comprising a block of resilient material formed with a plurality of elongated parallel apertures parallel to the long dimension thereof, secured at the center region of a longer edge portion thereof to the load and at the center region of the opposite edge portion thereof to the supporting means, whereby the load is constrained to move along a path perpendicular to the long dimension of the flexure bearing.

2. In combination: a load; supporting means; and an elongated parallelogram flexure bearing comprising a block of resilient material formed with at least five elongated parallel apertures parallel to the long dimension thereof, the first pair of said apertures comprising first and second apertures having equal lengths and lying end-to-end, the second pair of said apertures comprising third and fourth apertures having equal lengths and lying end-to-end, and the fifth aperture having a length substantially greater than that of the other apertures and lying side-by-side with and between the first and second pairs of apertures, said bearing being secured to the supporting means at a first region thereof between the first and second apertures and being secured to the load at a second region thereof between the third and fourth apertures.

3. A parallelogram flexure element comprising, a block of resilient material formed with two elongated apertures therein aligned end-to-end, each of which opens onto opposite surfaces of said block, a third elongated aperture having a length somewhat more than double that of the first and second apertures which is parallel to and lies side-by-side with the first and second apertures, said third aperture also opening onto opposite surfaces of the block, and fourth and fifth elongated apertures of the same length and width as the first and second apertures, positioned similarly to the first and second apertures but on the other side of the third aperture, and including first means at the center region of one longer edge of the block for securing the block to a supporting structure, and second means at the center region of the opposite edge portion of the block for securing a movable load to the block.

4. An arrangement for permitting movement of a load along a linear path comprising, in combination: supporting means; and a pair of parallelogram flexure bearings comprising two blocks of resilient material, each formed with a plurality of elongated parallel apertures, one said bearing secured at an edge portion thereof parallel to the long dimension of said apertures to the load and at the opposite edge portion thereof to the supporting means, the second parallelogram flexure bearing secured at one end portion thereof parallel to the long dimension of said apertures to the opposite end portion of said load and at the opposite end portion of said second flexure bearing to the supporting means, whereby when the load is moved in a direction toward one of the parallelogram flexure bearings, it places that bearing under compression and the other bearing under tension and when it is moved toward the other flexure bearing, the reverse occurs.

5. In combination: a load; supporting means; an elongated parallelogram flexure bearing comprising a block of resilient material formed with at least five elongated parallel apertures parallel to the long dimension thereof, the first pair of said apertures comprising first and second apertures having equal lengths and lying end-to-end, the second pair of said apertures comprising third and fourth apertures having equal lengths and lying end-to-end, and the fifth aperture having a length substantially greater than that of the other apertures and lying side-by-side with and between the first and second pairs of apertures, said bearing being secured to the supporting means at a first region thereof between the first and second apertures and being secured to the load at a second region thereof between the third and fourth apertures; and energy dissipating material located in the first through the fourth apertures.

6. In combination: an elongated load; supporting means; a first elongated parallelogram flexure bearing comprising a block of resilient metal formed with at least five elongated parallel apertures parallel to the long dimension thereof, the first pair of said apertures comprising first and second apertures having equal lengths and lying end-to-end, the second pair of said apertures comprising third and fourth apertures having equal lengths and lying end-to-end, and the fifth aperture having a length substantially greater than that of the other apertures and lying side-by-side with and between the first and second pairs of apertures, said bearing being secured to the supporting means at a first region thereof between the first and second apertures and being secured to the end portion of the load at a second region thereof between the third and fourth apertures; and a second parallelogram flexure bearing, substantially identical to the first such bearing, secured to the supporting means at a first region thereof between its first and second apertures and secured to the opposite end portion of the load at a second region thereof between its third and fourth apertures.

7. A parallelogram flexure bearing comprising, a block of resilient material formed with two elongated apertures therein aligned end-to-end, each of which opens onto opposite surfaces of said block, a third elongated aperture having a length somewhat more than double that of the first and second apertures which is parallel to and lies side-by-side with the first and second apertures, said third aperture also opening onto opposite surfaces of the block, and fourth and fifth elongated apertures of the same length and width as the first and second apertures, positioned similarly to the first and second apertures but on the other side of the third aperture; first means at the center region of one longer edge of the block for securing the block to a supporting structure; second means at the center region of the opposite edge portion of the block for securing a movable load to the block; and energy dissipating material located in the first, second, fourth and fifth apertures.

8. A flexure bearing comprising, a block of resilient material formed with four symmetrically arranged, elongated openings therethrough, each opening lying end-to-end with one other opening, and a fifth opening more than double the length of the other openings, lying side-by-side with the other four openings, the first and second openings lying on one side of the fifth opening and the third and fourth openings lying on the other side of the fifth opening; means at a region of the bearing between the first and second openings adapted to secure the bearing to a support; and means at a region of the bearing between the third and fourth apertures therein adapted to secure the bearing to a movable load.

9. A flexure bearing comprising, a block of resilient material formed with four symmetrically arranged, elongated, substantially identical, openings therethrough, each opening lying end-to-end with one other opening, and a fifth opening more than double the length of the other openings, lying side-by-side with the other four openings, the first and second openings lying on one side of the fifth opening and the third and fourth openings lying on the other side of the fifth opening; means at a region of the bearing between the first and second openings adapted to secure the bearing to a support; and means at a region of the bearing between the third and fourth apertures therein adapted to secure the bearing to a movable load.

10. A flexure bearing comprising, a block of resilient material formed with four symmetrically arranged, elongated, substantially identical, openings therethrough, each opening lying end-to-end with one other opening, and a fifth opening more than double the length of the other openings, lying side-by-side with the other four openings, the first and second openings lying on one side of the fifth opening and the third and fourth openings lying on the other side of the fifth opening; means at a region of the bearing between the first and second openings adapted to secure the bearing to a support; means at a region of the bearing between the third and fourth apertures therein adapted to secure the bearing to a movable load; and energy dissipating means located in at least some of the first four openings.

References Cited by the Examiner

UNITED STATES PATENTS

| | | | |
|---|---|---|---|
| 2,352,049 | 6/1944 | Weaver | 248—27 |
| 2,971,383 | 2/1961 | Thrasher | 74—5 |
| 3,162,723 | 12/1964 | McCurtain | 174—138 |
| 3,185,428 | 5/1965 | Farabaugh et al. | 248—358 |
| 3,275,275 | 9/1966 | Erhart et al. | 248—358 |

CLAUDE A. LE ROY, *Primary Examiner.*

JOHN PETO, *Examiner.*